US009274995B2

(12) United States Patent
Tsuji

(10) Patent No.: US 9,274,995 B2
(45) Date of Patent: Mar. 1, 2016

(54) ELECTRONIC APPARATUS

(71) Applicant: KABUSHIKI KAISHA TOSHIBA, Minato-ku, Tokyo (JP)

(72) Inventor: Kiyotaka Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 364 days.

(21) Appl. No.: 13/949,598

(22) Filed: Jul. 24, 2013

(65) Prior Publication Data

US 2014/0207990 A1   Jul. 24, 2014

(30) Foreign Application Priority Data

Jan. 18, 2013   (JP) ................. 2013-007676

(51) Int. Cl.
G06F 13/14   (2006.01)
G06F 13/40   (2006.01)

(52) U.S. Cl.
CPC .................. G06F 13/409 (2013.01)

(58) Field of Classification Search
CPC ............ H05K 7/10; H04M 1/72527
USPC ....................................... 710/301
See application file for complete search history.

(56) References Cited

U.S. PATENT DOCUMENTS 8,050,333 B2   11/2011 Muto et al.

FOREIGN PATENT DOCUMENTS

JP   2008-022392 A   1/2008

OTHER PUBLICATIONS

Background Art Information: Concise Explanation for JP 2008-22392, Toshiba.

*Primary Examiner* — Titus Wong
(74) *Attorney, Agent, or Firm* — Knobbe, Martens, Olson & Bear LLP

(57) ABSTRACT

According to one embodiment, first monitor controller of electronic circuit board recognizes free slot into which the electronic circuit board has been hot-inserted, notifies host control device of start together with slot information causes first parameter setting module to change reception parameter of first T/R circuit module. The host control device instructs switch processing board to change transmission parameter, in response to slot information and start notification. Second monitor controller of the switch processing board causes second parameter setting module to change transmission parameter of second T/R circuit module, in accordance with an instruction from the host control device.

20 Claims, 14 Drawing Sheets

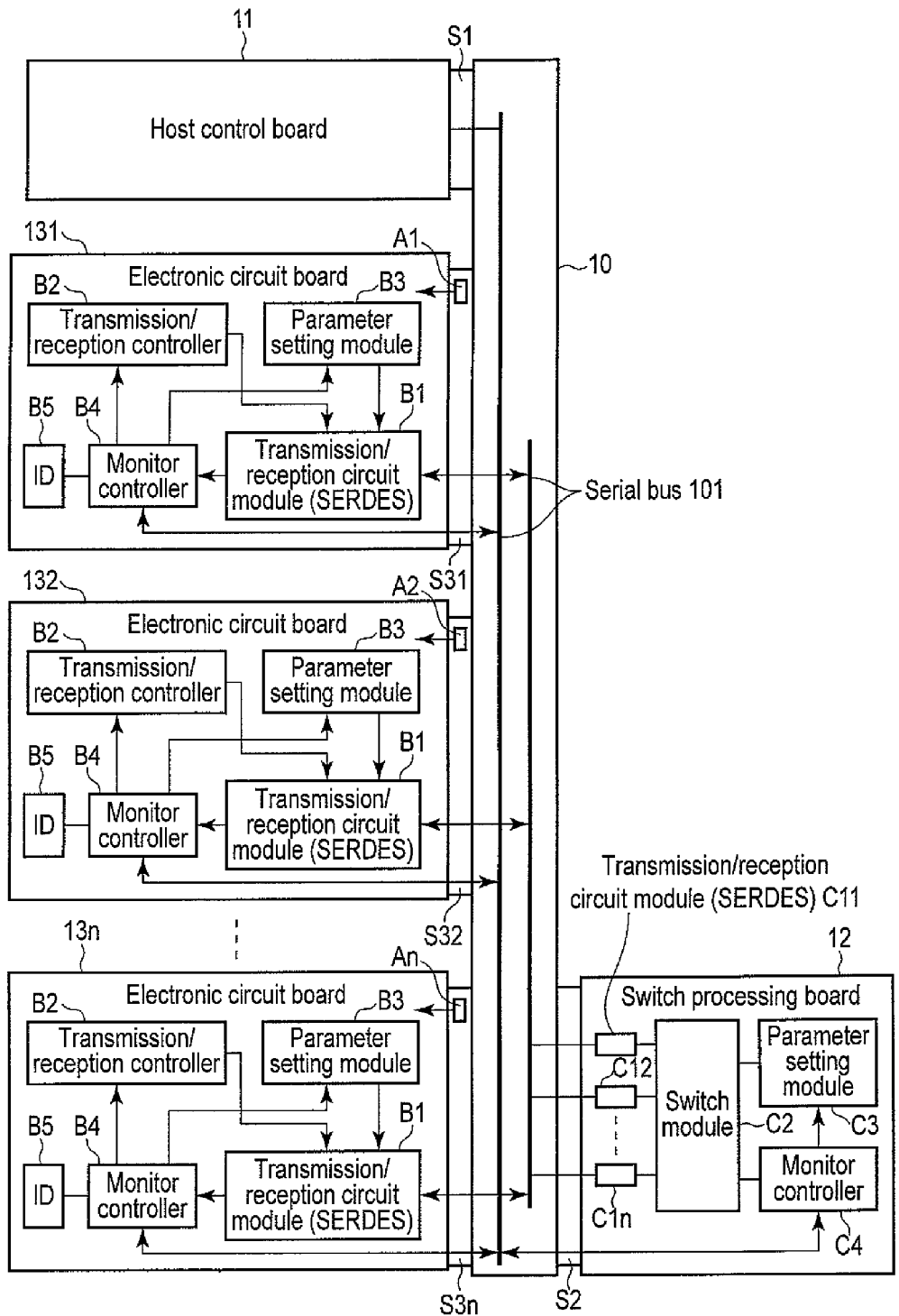
F I G. 1

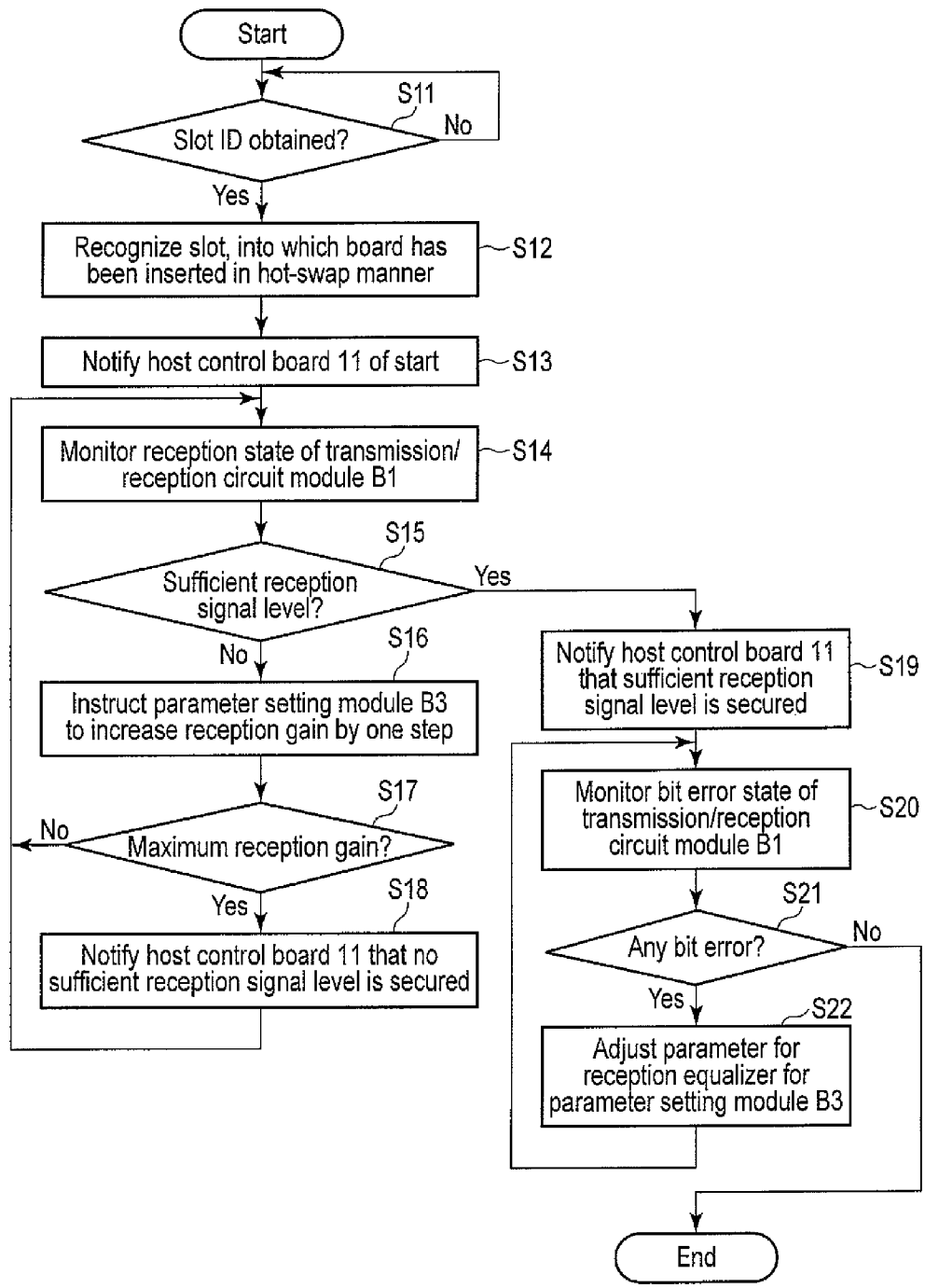
F I G. 2

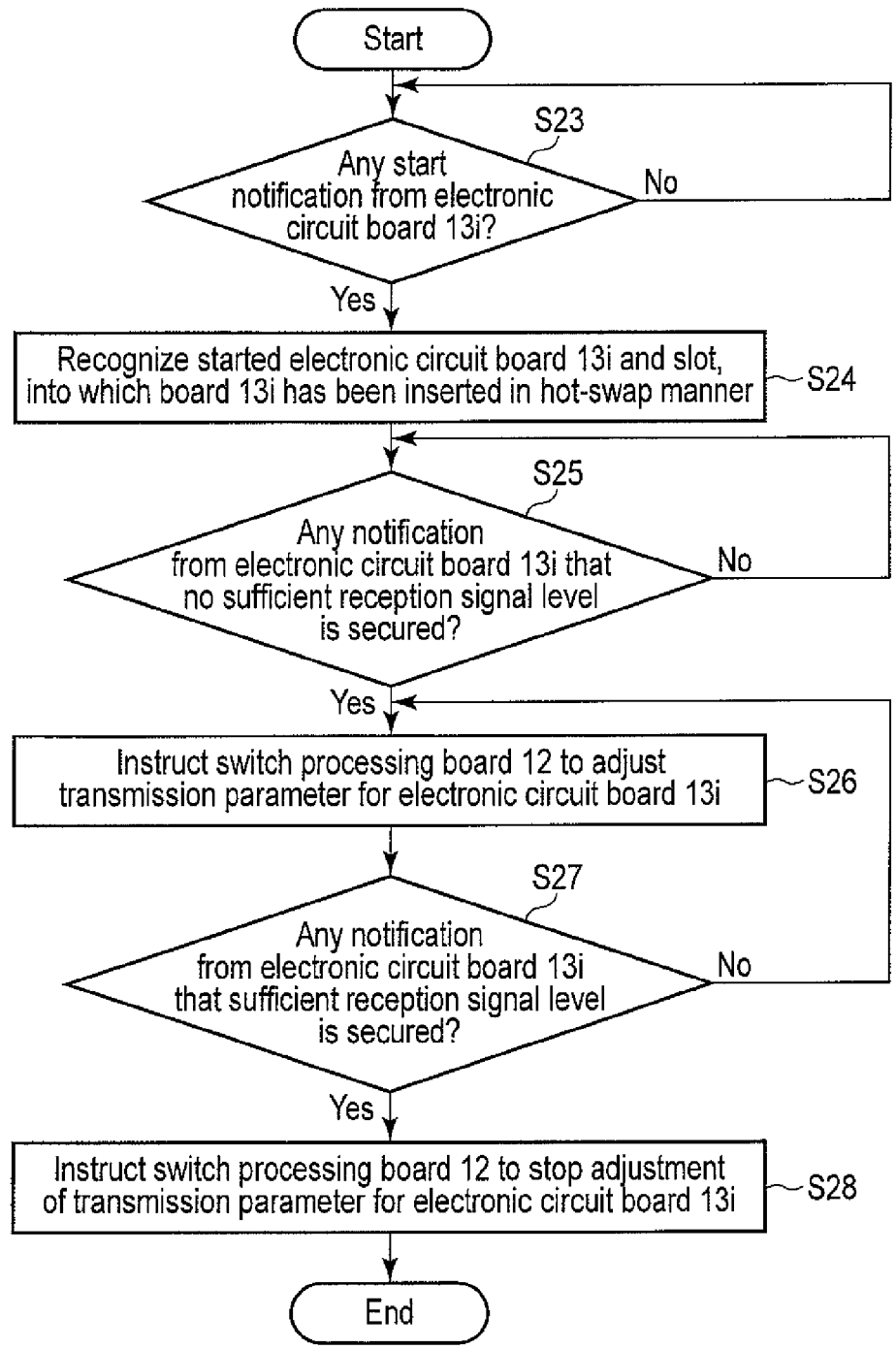
F I G. 3

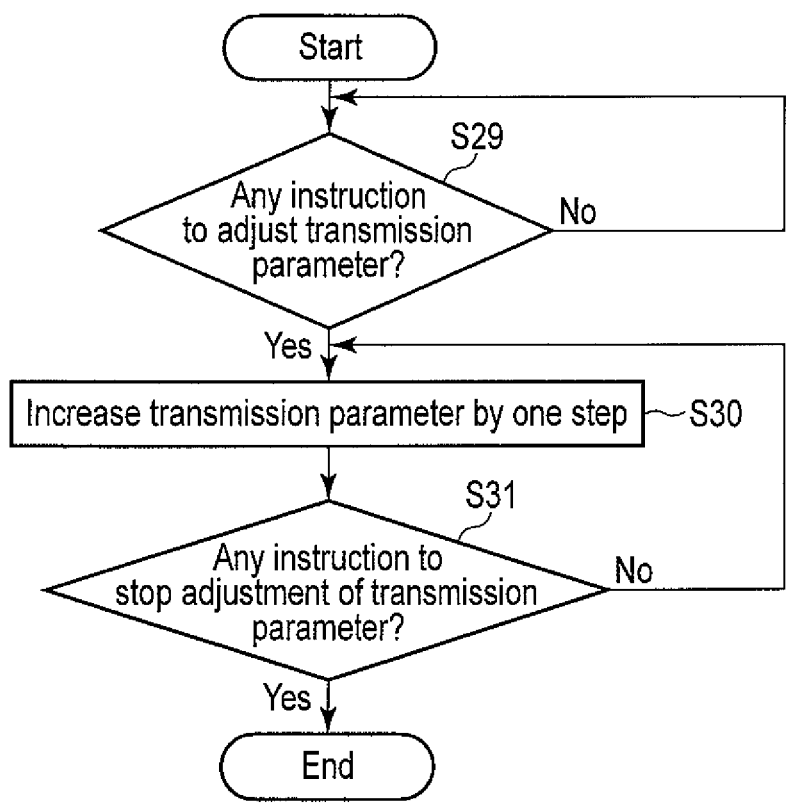
F I G. 4

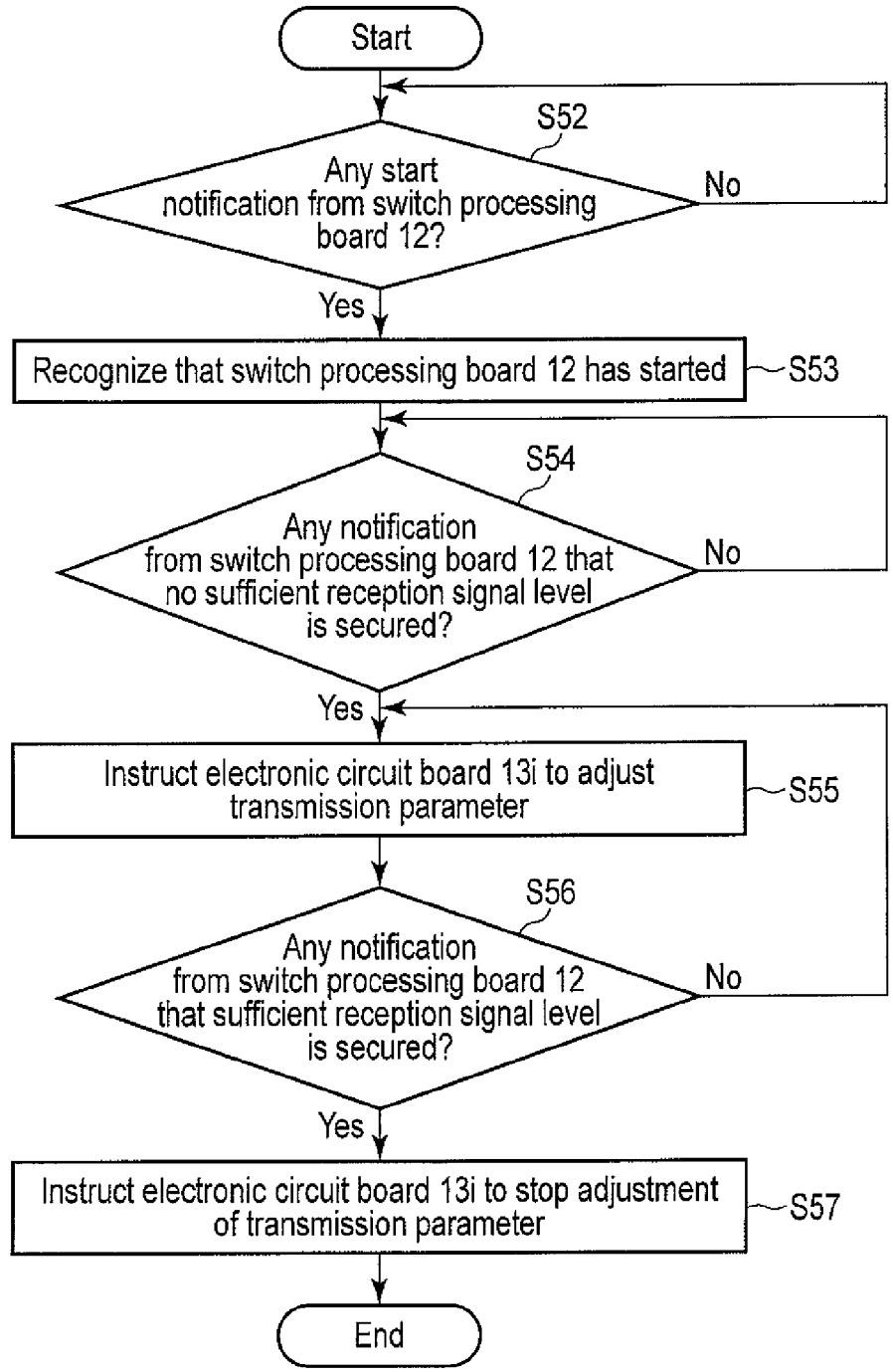
F I G. 6

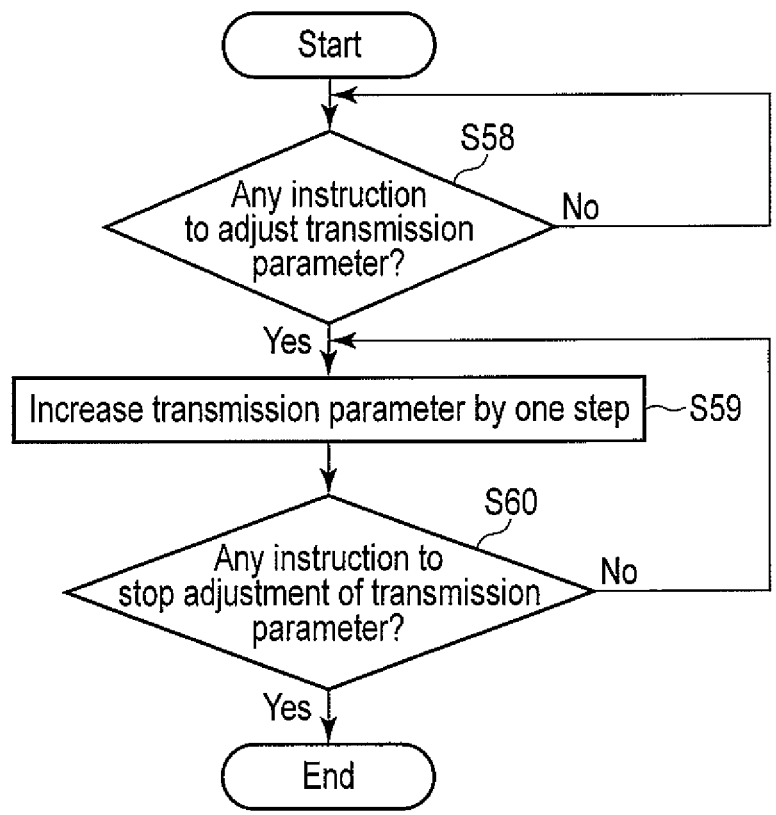
F I G. 7

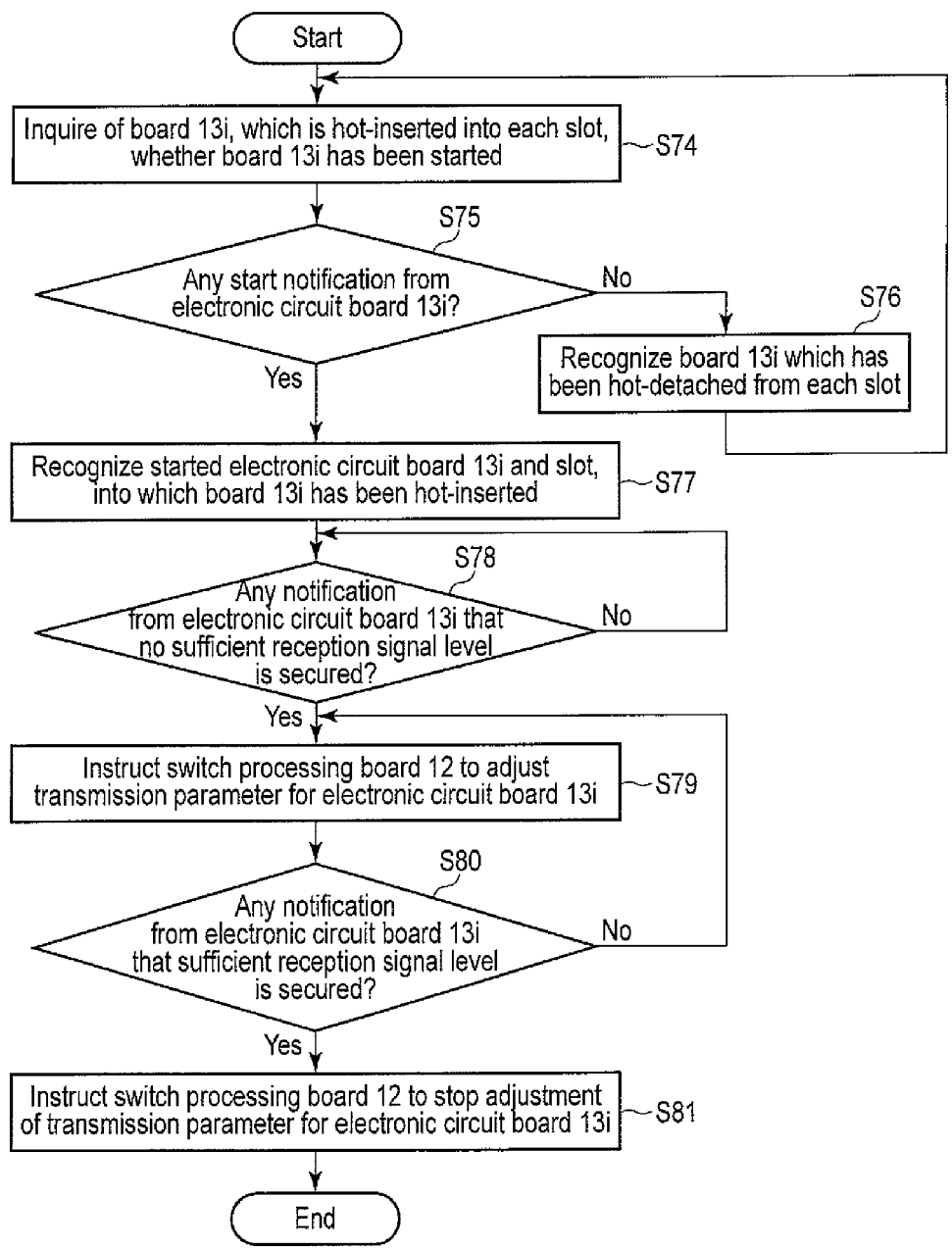
F I G. 9

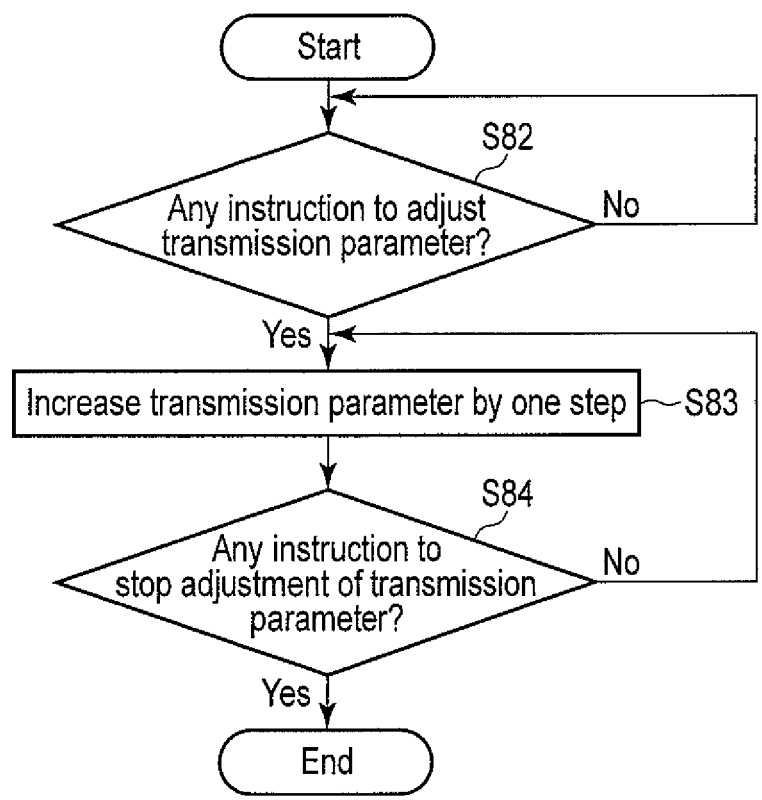
F I G. 10

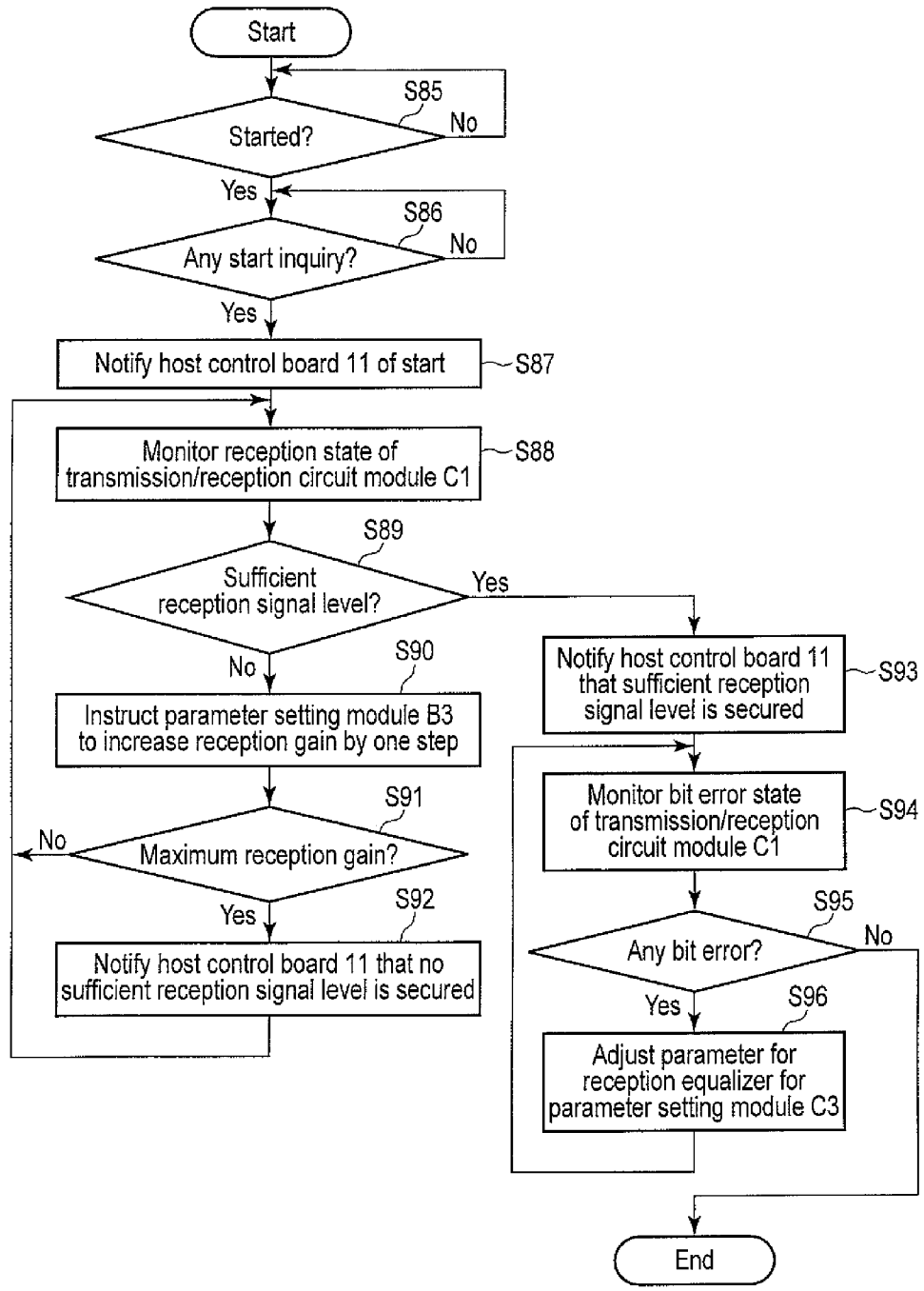
F I G. 11

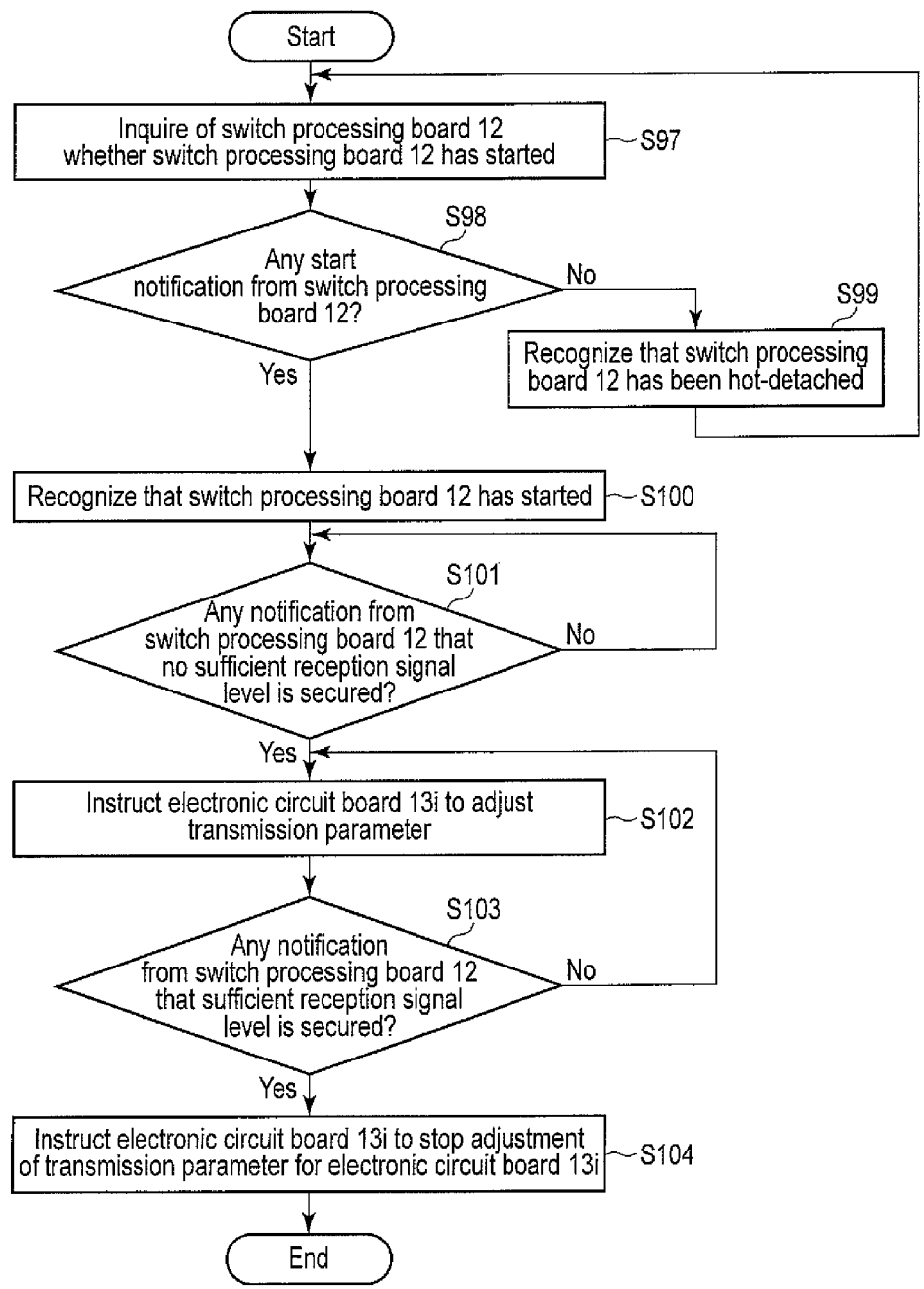
F I G. 12

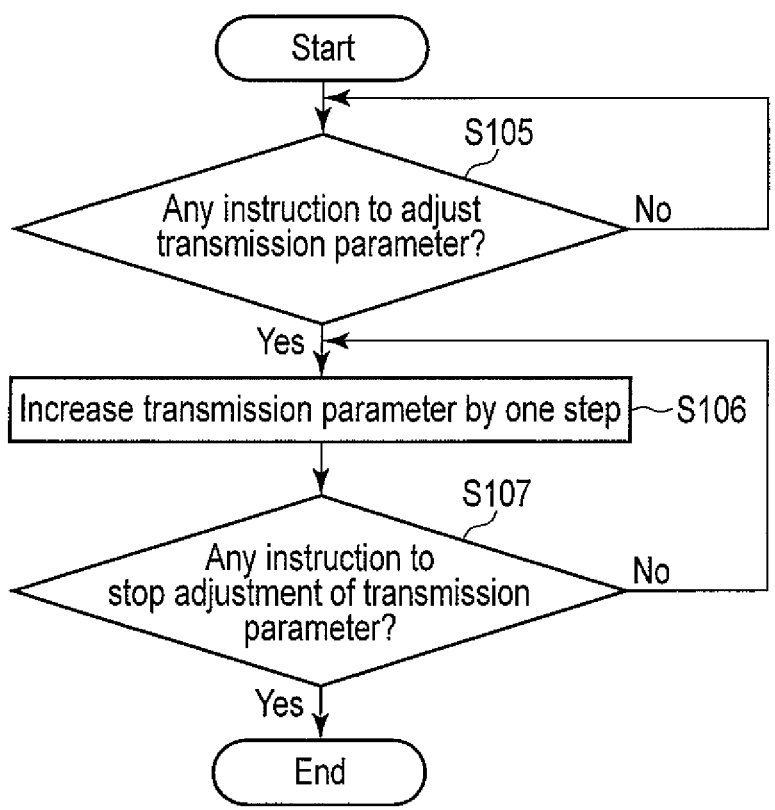
F I G. 13

ELECTRONIC APPARATUS

CROSS-REFERENCE TO RELATED APPLICATIONS

This application is based upon and claims the benefit of priority from Japanese Patent Application No. 2013-007676, filed Jan. 18, 2013, the entire contents of which are incorporated herein by reference.

FIELD

Embodiments described herein relate generally to an electronic apparatus having a function of transmission quality of transmission/reception signals for respective electronic circuit boards fitted into a plurality of free slots provided in a motherboard in a housing.

BACKGROUND

For example, in electronic apparatuses such as broadcasting transmitters, a plurality of electronic circuit boards having respective specific processing functions are detachably connected to a plurality of free slots provided in a motherboard in a housing. The motherboard is provided with a transmission line configured to perform signal transmission between the electronic circuit boards connected to the free slots by a differential method.

In the meantime, in the above electronic apparatuses, transmission parameters and reception parameters (such as a signal amplitude, a drive current, a reception gain, and an equalizer) to improve the transmission quality are automatically set for a substrate which has been first mounted to the free slot of the motherboard in the housing, directly after the power of the housing is turned on.

On the other hand, when the board breaks down or the construction is to be changed during operation in the above electronic apparatuses, a new board must be hot-inserted without stopping the operation. When a new board is hot-inserted, however, the power of the housing is not turned on again, and thus parameters are not automatically set. In this case, although the parameter set value of the old board is different from the parameter set value of the new board, automatic parameter setting is not performed. Thus, the operation processing may be disordered simultaneously with hot-insertion of the new electronic circuit board, and the communication quality may be adversely influenced.

BRIEF DESCRIPTION OF THE DRAWINGS

FIG. 1 is a block diagram illustrating an example of a configuration of an electronic apparatus according to first to third embodiments.

FIG. 2 is a flowchart illustrating a flow of reception setting processing performed by a monitor controller in each electronic circuit board according to the first embodiment.

FIG. 3 is a flowchart illustrating a flow of processing performed by the host control board in the reception setting processing in the electronic circuit board according to the first embodiment.

FIG. 4 is a flowchart illustrating a flow of transmission setting processing performed by a switch processing board according to the first embodiment.

FIG. 6 is a flowchart illustrating a flow of processing performed by the host control board in the reception setting processing in the switch processing board according to the first embodiment.

FIG. 7 is a flowchart illustrating a flow of transmission setting processing performed by the monitor controller of each electronic circuit board according to the first embodiment.

FIG. 9 is a flowchart illustrating a flow of processing performed by a host control board in the reception setting processing in an electronic circuit board according to the second embodiment.

FIG. 10 is a flowchart illustrating a flow of transmission setting processing performed by a switch processing board according to the second embodiment.

FIG. 11 is a flowchart illustrating a flow of reception setting processing performed by a communication switch processing board according to the second embodiment.

FIG. 12 is a flowchart illustrating a flow of processing performed by the host control board in the reception setting processing in a switch processing board according to the second embodiment.

FIG. 13 is a flowchart illustrating a flow of transmission setting processing performed by the monitor controller of each electronic circuit board according to the second embodiment.

DETAILED DESCRIPTION

Figure 5:
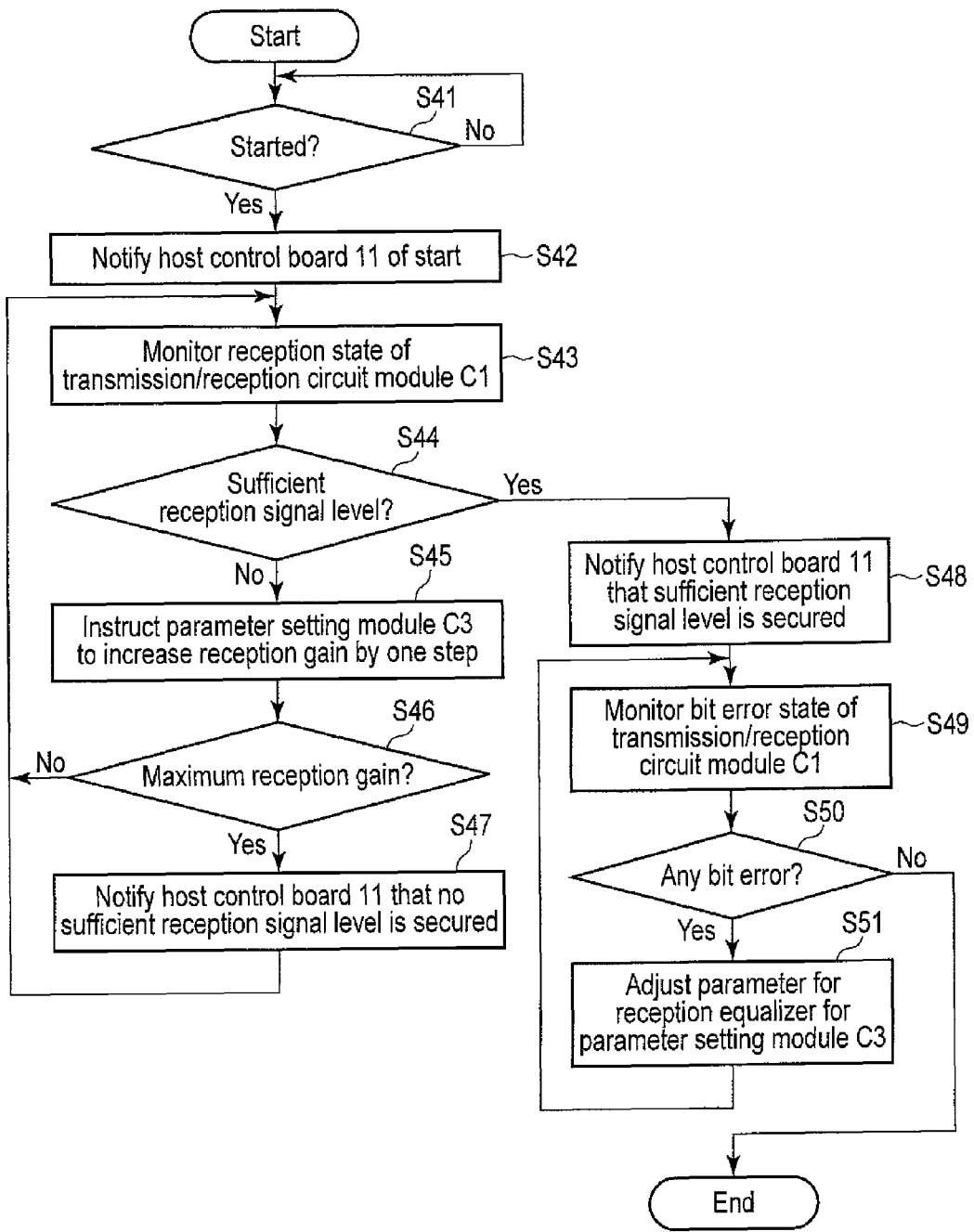
FIG. 5 is a flowchart illustrating a flow of reception setting processing performed by a communication switch processing board according to the first embodiment.

In general, according to one embodiment, an electronic apparatus includes a transmission device, a host controller, an electronic circuit board, and a switch processing board. The transmission device includes a plurality of free slots configured to detachably connect boards to a transmission line, a dedicated slot connected to all the free slots through the transmission line, and a plurality of identification code generators provided in the respective free slots and providing the boards inserted into the free slots with slot identification codes. The host controller manages quality of transmission and reception signals of boards connected to the free slots and the dedicated slot of the transmission device. The electronic circuit board is inserted into one of the free slots, the electronic circuit board including a first transmission/reception circuit board to transmit and receive signals through the transmission line in accordance with transmission/reception parameters, a transmission/reception controller to control transmission/reception processing of the first transmission/reception circuit module, a first parameter setting module to set the transmission/reception parameters in the first transmission/reception circuit module, and a first monitor controller to monitor an operation state of the first transmission/reception circuit module and controls the first parameter setting module. The switch processing board connects to the dedicated slot, the switch processing board includes a plurality of second transmission/reception circuit modules to transmit and receive signals to and from electronic circuit boards inserted into the respective free slots in accordance with the transmission/reception parameters, a switch module to selectively turn on and off transmission/reception processing of each of the second transmission/reception circuit modules, a second parameter setting module to set the transmission/reception parameters in the second transmission/reception circuit modules, and a second monitor controller to monitor an operation state of each of the second transmission/reception circuit modules and control the second parameter setting module. When the electronic circuit board is hot-inserted into one of the free slot, the first monitor controller of the electronic circuit board recognizes the free slot, into which the electronic circuit board has been hot-inserted, by obtaining a slot identification code from the identification code generator corresponding to the free slot into which the electronic circuit board has been hot-inserted, notifies the host control device of start together with slot information recognized by the host control device, monitors a reception state of the first transmission/reception circuit module, causes the first parameter setting module to change the reception parameter of the first transmission/reception circuit module such that the reception state is changed to a predetermined state, and notifies the host control device that the reception state is not changed to the predetermined state when the reception state is not changed to the predetermined state. The host control device instructs the switch processing board to change the transmission parameter, in response to the slot information and start notification, such that the reception state of the electronic circuit board which has issued the notification is changed to the predetermined state. The second monitor controller of the switch processing board causes the second parameter setting module to change the transmission parameter of the second transmission/reception circuit module, in accordance with an instruction from the host control device.

Embodiments will now be explained with reference to drawings.

An electronic apparatus according to the embodiment will be explained hereinafter with reference to drawings.

First Embodiment

FIG. 1 is a block diagram illustrating an example of a configuration of an electronic apparatus according to the first embodiment. FIG. 1 illustrates an example in the case where the number of contained boards is n.

In the electronic apparatus, a motherboard 10 serving as a transmission device is disposed in a housing. The motherboard 10 includes a first slot S1, a second slot S2, and n third slots S31 to S3n. The motherboard 10 is provided with a serial bus 101 serving as a transmission line, and a control bus 102. The serial bus 101 is connected with transmission/reception signal transmission lines of the second slot S2 and the n third slots S31 to S3n. The control bus 102 is connected with control signal transmission lines of the second slot S2 and the n third slots S31 to S3n. The first and second slots S1 and S2 are dedicated slots to which a host control board 11 and a switch processing board 12 are detachably connected, respectively. The n third slots S31 to S3n are free slots to which n electronic circuit boards 131 to 13n are detachably connected in an unrestricted order. The third slots S31 to S3n include slot identification data (hereinafter referred to as "slot ID") issuing modules A1 to An, respectively. The slot ID issuing modules A1 to An issue a slot ID, when the electronic circuit board 13i (i is one of 1 to n) is attached, to notify the attached board thereof.

The host control board 11 manages qualities of transmission/reception signals of the electronic circuit boards 131 to 13n connected to the n third slots S31 to S3n of the motherboard 10, and the switch processing board 12 connected to the second slot S2.

Each of the electronic circuit boards 13i includes a transmission/reception circuit module (SERDES: SERializer/DESerializer) B1, a transmission/reception controller B2, a parameter setting module B3, a monitor controller B4, and a slot ID manager B5. Transmission/reception circuit module B1 is a transmission/reception circuit which has a parallel/serial converting function of transmitting/receiving signals through the serial bus of the motherboard 10 in accordance with set transmission/reception parameters. The transmission/reception controller B2 controls transmission/reception processing of transmission/reception circuit module B1. The parameter setting module B3 sets transmission/reception parameters for transmission/reception circuit module B1. The monitor controller B4 monitors the operation state of transmission/reception circuit module B1, and sets proper transmission/reception parameters in transmission/reception circuit module B1 through the parameter setting module B3, in accordance with the operation state or an instruction from the host control board 11. The slot ID manager B5 receives and registers a slot ID issued from the slot ID issuing module Ai of the slot, when the electronic circuit board has been attached to any third slot S3i of the motherboard 10. Transmission and reception parameters suitable for its distance from the switch processing board 12 are registered for each slot ID in advance in the parameter setting module B3.

The transmission parameter is, for example, a signal amplitude value, and/or a drive current value. The reception parameter is, for example, a reception gain, and/or an equalizer value. The monitor controller B4 monitors the signal reception state of transmission/reception circuit module B1, monitors a signal level and a bit error of the received signal, and changes the reception parameters for the reception gain and the equalizer value through the parameter setting module B3, such that the values have proper values. The monitor controller B4 also changes the transmission parameter for the signal amplitude or the drive current through the parameter setting module B3, in accordance with an instruction from the host control board 11.

The switch processing board 12 is provided with a transmission/reception circuit modules (SERDES: SERializer/DESerializer) C11 to C1n, a switch module C2, a parameter setting module C3, and a monitor controller C4. Transmission/reception circuit modules C11 to C1n are connected to respective n transmission lines which are connected to the serial bus of the motherboard 10 through the second slot S2. Transmission/reception circuit module C1i of number i is a transmission/reception circuit having a parallel/serial converting function of transmitting/receiving signals to and from the electronic circuit board 13i connected to the corresponding third slot S3i of number i through the serial bus of the motherboard 10, in accordance with the set transmission/reception parameters. The switch module C1 selectively turns on and off transmission/reception processing of transmission/reception circuit module C1i designated by an instruction from the monitor controller C4. The parameter setting module C3 sets transmission/reception parameters for transmission/reception circuit modules C11 to C1n. The monitor controller C4 monitors the operation state of each of transmission/reception circuit modules C11 to C1n, and sets proper transmission/reception parameters for each of transmission/reception circuit modules C11 to C1n through the parameter setting modules C3, in accordance with the operation state or an instruction from the host control board 11.

The transmission parameter is, for example, a signal amplitude value, and/or a drive current value. The reception parameter is, for example, a reception gain, and/or an equalizer value. The monitor controller C4 monitors the signal reception state of transmission/reception circuit module C1$i$, monitors a signal level and a bit error of the received signal, and changes the reception parameter for the reception gain and the equalizer value through the parameter setting module C3, such that the values have proper values. The monitor controller C4 also changes the transmission parameter for the signal amplitude or the drive current through the parameter setting module C3, in accordance with an instruction from the host control board 11.

The following is explanation of initial setting and adjustment performed in the electronic apparatus having the above structure.

When the electronic circuit board 13$i$ is attached to (turning on the power of the apparatus or hot-insertion of the board) one of the third slots S31 to S3$n$, the monitor controller B4 reads the slot ID issued from the slot ID issuing module A1 of the third slot S3$i$, into which the board has been fitted, stores the read slot ID in the slot ID manager B5. Then, the monitor controller B4 reads transmission parameter and reception parameter corresponding to the slot ID from the parameter setting module B3, and sets the parameters in transmission/reception circuit module B1 as initial setting.

Specifically, when the third slot S3$i$, into which the electronic circuit board is fitted, is determined, the distance from the switch processing board 12 is determined from the position of the slot. Thus, in the electronic apparatus of the present embodiment, transmission/reception parameters corresponding to the distance of each slot from the switch processing board 12 are registered in advance in the parameter setting module B3 in correlation with the slot ID. Then, when the electronic circuit board is fitted into the slot, transmission/reception parameters corresponding to the read slot ID are read from the parameter setting module B3, and set in transmission/reception circuit module B1. Thereby, even when the electronic circuit board 13$i$ is attached to any third slot S3$i$, proper transmission/reception parameters can be set, and transmission quality between the boards can be stabilized. In addition, since the slot ID is correlated with the transmission/reception parameters, setting can be performed for a relatively short time.

In the meantime, in the above electronic apparatus, a transmission parameter and a reception parameter (such as signal amplitude, drive current, reception gain, and equalizer) are automatically set for a board which has been first mounted to a free slot of the motherboard in the housing, directly after the power of the housing is turned on.

On the other hand, when the board breaks down or the constitution is changed during operation of the electronic apparatus, a new or repaired board is hot-inserted, without stopping the operation. When the board is hot-inserted, the power of the housing is not turned on again, and thus the parameters are not automatically set in that state. Thus, in the present embodiment, control based on hot swap is performed in each board, to automatically set parameters in hot swap.

The following is explanation of adjustment of the transmission/reception parameters in hot swap performed in the electronic circuit board 13$i$, the host control board 11, and the switch processing board 12.

First, parameter adjustment performed to cause a transmission signal output from the switch processing board 12 to be securely received by each electronic circuit board 13$i$ will be explained hereinafter.

FIG. 2 is a flowchart illustrating a flow of processing of reception parameter setting performed in the monitor controller B4 of each electronic circuit board 13$i$ in hot swap of the board 13$i$. FIG. 3 is a flowchart illustrating a flow of processing performed by the host control board 11 when the electronic circuit board 13$i$ is hot-inserted. FIG. 4 is a flowchart illustrating a flow of transmission setting processing performed in the monitor controller C4 of the switch processing board 12.

In FIG. 2, when the electronic circuit board 13$i$, which the monitor controller B4 belongs to, is hot-inserted and a slot ID issued from the slot ID issuing module A$i$ is obtained (Step S11), the monitor controller B4 recognizes the slot, into which the electronic circuit board 13$i$ has been hot-inserted, based on the slot ID (Step S12), and notifies the host control board 11 of the slot, into which the board 13$i$ has been hot-inserted and that the board 13$i$ has started (Step S13). Thereby, the host control board 11 recognizes the slot, into which the electronic circuit board 13$i$ has been hot-inserted.

Thereafter, the monitor controller B4 monitors the reception state of transmission/reception module B1 (Step S14), and determines whether the reception signal level is sufficient or not (Step S15). When the monitor controller B4 determines that the reception signal level is not sufficient (No), the monitor controller instructs the parameter setting module B3 to increase the reception gain by one step (Step S16). In this state, the monitor controller B4 determines whether the reception gain is maximum or not (Step S17). When the monitor controller B4 determines that the reception gain is not maximum (No), the monitor controller B4 returns to Step S14 to continue monitoring of the reception state, and repeats increase in the reception gain by one step in Step S16, until it is determined in Step S15 that the reception signal level is sufficient or it is determined in Step S17 that the reception gain is maximum. When it is determined in Step S17 that the reception gain is maximum (Yes), the monitor controller B4 notifies the host control board 11 that no sufficient reception signal level is secured (Step S18). When it is determined in Step S15 that the reception signal level is sufficient (Yes), the monitor controller B4 notifies the host control board 11 of it (Step S19).

As illustrated in FIG. 3, the host control board 11 monitors start notification from the electronic circuit board 13$i$ (Step S23). When the host control board 11 receives start notification from any electronic circuit board 13$i$ (Yes), the host control board 11 recognizes the started electronic circuit board 13$i$ and the slot, into which the electronic circuit board 13$i$ has been hot-inserted (Step S24).

Then, the host control board 11 determines whether there is any notification that no sufficient reception signal level is secured in each electronic circuit board 13$i$ (Step S25). When it is determined in Step S25 that there is notification that no sufficient reception signal level is secured (Yes), the host control board 11 instructs the switch processing board 12 to increase the transmission parameter for the signal amplitude or the drive current by one step (Step S26), as transmission setting for the electronic circuit board 13$i$. Then, the host control board 11 determines whether there is notification that sufficient reception signal level is secured (Step S27), and repeats the processing of Step S26 until the host control board 11 receives notification that sufficient reception signal level is secured. When it is determined in Step S27 that sufficient reception signal level is secured (Yes), the host control board 11 stops the processing of Step S26, and stops the instruction to increase the transmission parameter for the switch processing board 12 (Step S28).

On the other hand, as illustrated in FIG. 4, the monitor controller C2 in the switch processing board 12 determines whether there is any instruction to adjust the transmission parameter from the host control board 11 (Step S29). When there is any instruction to adjust the transmission parameter in Step S29 (Yes), the monitor controller C2 increases the transmission parameter for the signal amplitude or the drive current of transmission/reception circuit module Ci1 corresponding to the electronic circuit board 13*i* by one step for the parameter setting module C3 (Step S30), and continues to increase the transmission parameter in Step S30 until an instruction to stop adjustment is issued (Step S31).

On the other hand, as illustrated in FIG. 2, when the monitor controller B4 in the electronic circuit board 13*i* determines in Step S15 that the reception signal level is sufficient (Yes), the monitor controller B4 notifies the host control board 11 that sufficient reception signal level is secured (Step S19). Then, the monitor controller B4 monitors the bit error state of transmission/reception circuit module B1 (Step S20), and determines whether there is any bit error (Step S21). In this step, when the monitor controller B4 determines that there is any bit error (Yes), the monitor controller B4 adjusts the parameter for the reception equalizer in the parameter setting module B3 (Step S22). Then, the monitor controller B4 returns to Step S20, and continues monitoring of the bit error state. When it is determined in Step S21 that there are no bit errors (No), the reception setting processing is ended.

According to the above processing, even when the electronic circuit board 13*i* is hot-inserted into a desired slot, the reception parameter of the electronic circuit board 13*i* can be automatically adjusted, and the transmission signal output from the switch processing board 12 can be securely received by the electronic circuit board 13*i* which has been hot-inserted.

The following is explanation of adjustment performed to cause a transmission signal output from the electronic circuit board 13*i*, which has been hot-inserted, to be securely received by the switch processing board 12.

FIG. 5 is a flowchart illustrating a flow of reception setting processing performed by the monitor controller C4 of the switch processing board 12, FIG. 6 is a flowchart illustrating a flow of processing performed by the host control board 11 when the reception setting processing is performed in the communication switch board 12, and FIG. 7 is a flowchart illustrating a flow of transmission setting processing performed by the monitor controller B4 of each electronic circuit board 13*i*.

As illustrated in FIG. 5, the monitor controller C4 in the communication switch board 12 determines whether the apparatus has started or not (Step S41). When it is determined that the apparatus has started (Yes), the monitor controller C4 notifies the host control board 11 that the apparatus has started (Step S42). Then, the monitor controller C4 monitors the reception state of the transmission/reception circuit board C1 (Step S43), and determines whether the reception signal level is sufficient or not (Step S44). When the monitor controller C4 determines that the reception signal level is not sufficient (No), the monitor controller C4 instructs the parameter setting module C3 to increase the reception gain by one step (Step S45). In this state, the monitor controller C4 determines whether the reception gain is maximum or not (Step S46). When the monitor controller C4 determines that the reception gain is not maximum (No), the monitor controller C4 returns to Step S43 to continue monitoring of the reception state, and repeats increase in the reception gain by one step in Step S45, until it is determined in Step S43 that the reception signal level is sufficient or it is determined in Step S46 that the reception gain is maximum. When it is determined in Step S46 that the reception gain is maximum (Yes), the monitor controller C4 notifies the host control board 11 that no sufficient reception signal level is secured (Step S47). When it is determined in Step S44 that the reception signal level is sufficient (Yes), the monitor controller C4 notifies the host control board 11 of it (Step S48).

As illustrated in FIG. 6, the host control board 11 determines whether there is any start notification from the switch processing board 12 (Step S52). When the host control board 11 receives start notification from the switch processing board 12 (Yes), the host control board 11 recognizes that the switch processing board 12 has started (Step S53), and determines whether there is any notification from the switch processing board 12 that no sufficient reception signal level is secured (Step S54). When there is notification that no sufficient reception signal level is secured (Yes), the host control board 11 instructs the electronic circuit board 13*i*, which has been hot-inserted, to increase the transmission parameter for the signal amplitude or the drive current by one step (Step S55), as transmission setting for the switch processing board 12. Then, the host control board 11 determines whether there is notification that sufficient reception signal level is secured (Step S56), and repeats the processing of Step S55 until the host control board 11 receives notification that sufficient reception signal level is secured. When it is determined in Step S56 that sufficient reception signal level is secured (Yes), the host control board 11 stops the processing of Step S55, and instructs the electronic circuit board 13*i* to stop adjustment of the transmission parameter (Step S57).

On the other hand, as illustrated in FIG. 7, the monitor controller B4 in the electronic circuit board 13*i* determines whether there is any instruction to adjust the transmission parameter from the host control board 11 (Step S58). When there is any instruction to adjust the transmission parameter (Yes), the monitor controller B4 increases the transmission parameter for the signal amplitude or the drive current by one step for the parameter setting module B3 (Step S59), as transmission setting corresponding to transmission/reception circuit module C1*i* of the switch processing board 12, and continues to increase the transmission parameter of Step S59 until an instruction to stop setting is issued (Step S60).

In addition, as illustrated in FIG. 5, when the monitor controller C4 in the switch processing board 12 determines in Step S44 that the reception signal level is sufficient (Yes), the monitor controller C4 notifies the host control board 11 that sufficient reception signal level is secured (Step S48). Then, the monitor controller C4 monitors the bit error state of transmission/reception circuit module A1*i* (Step S49), and determines whether there is any bit error (Step S50). In this step, when the monitor controller C4 determines that there is any bit error (Yes), the monitor controller C4 adjusts the parameter for the reception equalizer in the parameter setting module C3 (Step S51). Then, the monitor controller C4 returns to Step S49, and continues monitoring of the bit error state. When it is determined in Step S49 that there are no bit errors (No), the reception setting processing is ended. Thereby, preparation for starting communication is ended.

As described above, although parameters are automatically set only when the power of the housing is turned on in prior art, according to the present embodiment, it is automatically recognized which slot the electronic circuit board has been inserted into in hot swap, and transmission/reception parameters can be automatically set. As a result, it becomes unnecessary to manually perform transmission setting and reception setting for the board when the board is hot-inserted, and the cost is reduced.

Second Embodiment

The first embodiment has the structure in which the hot-inserted electronic circuit board 13*i* notifies the host control board 11 of start of the board. In comparison with this, the second embodiment shows a structure in the case where the host control board 11 manages the insertion state of each slot.

The constitution of an electronic apparatus according to the second embodiment is the same as the constitution illustrated in the block diagram of FIG. 1. Thus, constituent elements of the second embodiment which are the same as those in the first embodiment are denoted by the same respective reference numbers.

Figure 8:
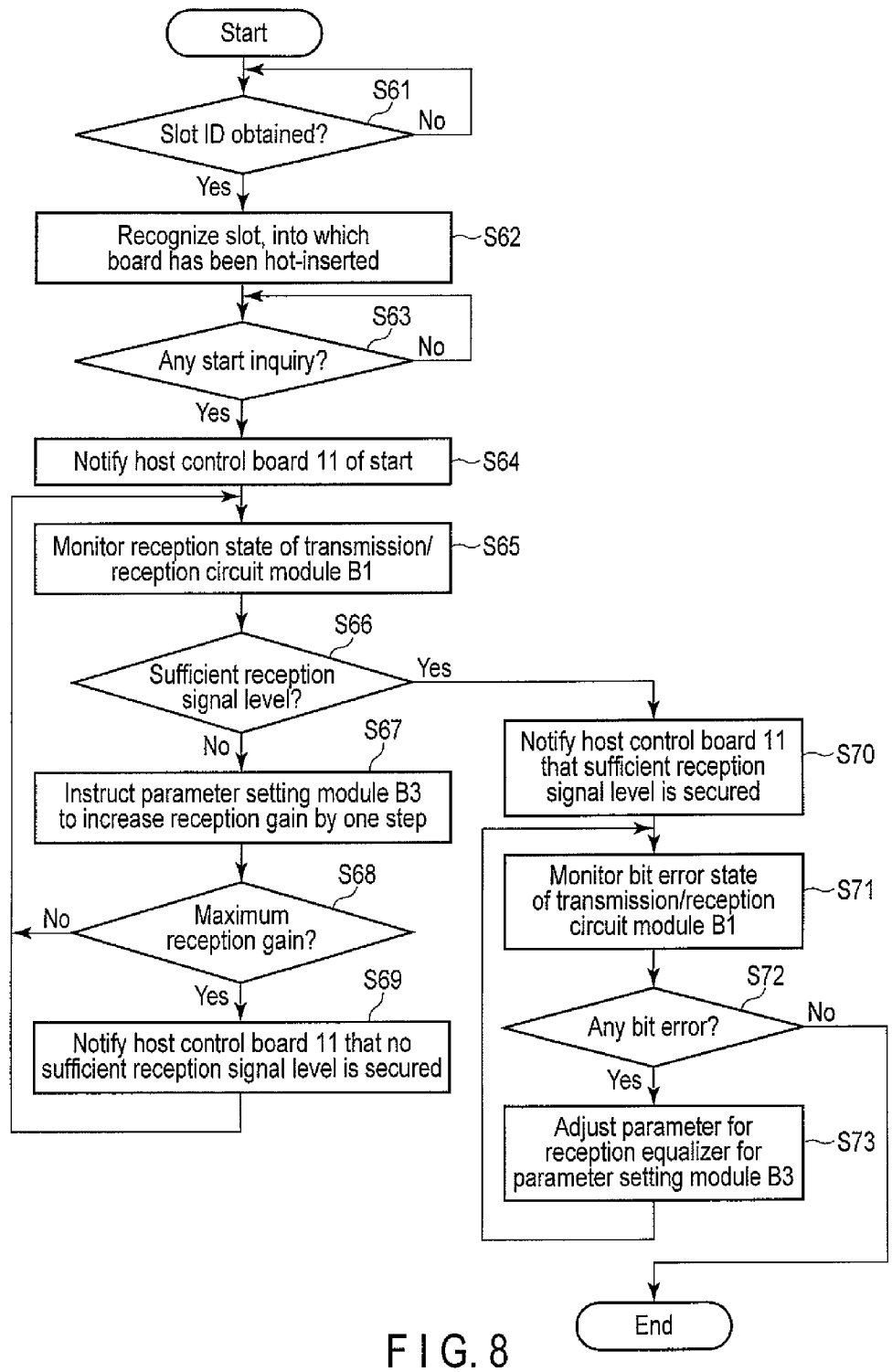
FIG. 8 is a flowchart illustrating a flow of reception setting processing performed by a monitor controller of each electronic circuit board according to the second embodiment.

FIG. 8 is a flowchart illustrating a flow of reception parameter setting processing performed by a monitor controller B4 of each electronic circuit board 13$i$ when the board 13$i$ is hot-inserted, in the electronic apparatus according to the second embodiment. FIG. 9 is a flowchart illustrating a flow of processing performed by a host control board 11 of the electronic apparatus according to the second embodiment, when the electronic circuit board 13$i$ is hot-inserted. FIG. 10 is a flowchart illustrating a flow of transmission setting processing performed by a monitor controller C4 of a switch processing board 12 of the electronic apparatus according to the second embodiment.

In FIG. 8, when the electronic circuit board 13$i$, which a monitor controller B4 belongs to, is hot-inserted and a slot ID issued from a slot ID issuing module A$i$ is obtained (Step S61), the monitor controller B4 recognizes the slot, into which the electronic circuit board 13$i$ has been hot-inserted, based on the slot ID (Step S62). In this state, the monitor controller B4 monitors inquiries about start, which are periodically transmitted for each slot from the host control board 11 and notifies the host control board 11 of the slot (S63). When any inquiry is received (Yes), the monitor controller B4 notifies the host control board 11 that the electronic circuit board 13$i$ is hot-inserted and started (Step S64). Thereby, the host control board 11 recognizes the slot, into which the electronic circuit board 13$i$ is hot-inserted.

Thereafter, the monitor controller B4 monitors the reception state of transmission/reception module B1 (Step S65), and determines whether the reception signal level is sufficient or not (Step S66). When the monitor controller B4 determines that the reception signal level is not sufficient (No), the monitor controller B4 instructs the parameter setting module B3 to increase the reception gain by one step (Step S67). In this state, the monitor controller B4 determines whether the reception gain is maximum or not (Step S68). When the monitor controller determines that the reception gain is not maximum (No), the monitor controller returns to Step S65 to continue monitoring of the reception state, and repeats increase in the reception gain by one step of Step S67, until it is determined in Step S66 that the reception signal level is sufficient or it is determined in Step S68 that the reception gain is maximum. When it is determined in Step S68 that the reception gain is maximum (Yes), the monitor controller B4 notifies the host control board 11 that no sufficient reception signal level is secured (Step S69). When it is determined in Step S66 that the reception signal level is sufficient (Yes), the monitor controller B4 notifies the host control board 11 of it (Step S70).

As illustrated in FIG. 9, the host control board 11 inquires of the board 13$i$, which has been hot-inserted into each slot, whether the board 13$i$ has been started (Step S74), and determines whether there is notification of start from the electronic circuit board 13$i$ (Step S75). In this step, the host control board 11 determines that no start notification is received from the slot, which has transmitted start notification before, and thereby recognizes the board 13$i$ having been hot-detached from the slot (Step S76). When the host control board 11 receives start notification from any electronic circuit board 13$i$ in Step S75 (Yes), the host control board 11 recognizes the started electronic circuit board 13$i$ and the slot, into which the electronic circuit board 13$i$ has been hot-inserted (Step S77).

Then, the host control board 11 determines whether there is any notification that no sufficient reception signal level is secured in each electronic circuit board 13$i$ (Step S78). When it is determined in Step S78 that there is notification that no sufficient reception signal level is secured (Yes), the host control board 11 instructs the switch processing board 12 to increase the transmission parameter for the signal amplitude or the drive current by one step (Step S79), as transmission setting for the electronic circuit board 13$i$. Then, the host control board 11 determines whether there is notification that sufficient reception signal level is secured (Step S80), and repeats the processing of Step S79 until the host control board 11 receives notification that sufficient reception signal level is secured. When it is determined in Step S80 that sufficient reception signal level is secured (Yes), the host control board 11 stops the processing of Step S79, and stops the instruction to increase the transmission parameter for the switch processing board 12 (Step S81).

On the other hand, as illustrated in FIG. 10, the monitor controller C2 in the switch processing board 12 determines whether there is any instruction to adjust the transmission parameter from the host control board 11 (Step S82). When there is any instruction to adjust the transmission parameter in Step S82 (Yes), the monitor controller C2 increases the transmission parameter for the signal amplitude or the drive current of transmission/reception circuit module C$i$1 corresponding to the electronic circuit board 13$i$ by one step for the parameter setting module C3 (Step S83), and continues to increase the transmission parameter of Step S83 until an instruction to stop adjustment is issued (Step S84).

On the other hand, as illustrated in FIG. 8, when the monitor controller B4 in the electronic circuit board 13$i$ determines in Step S66 that the reception signal level is sufficient (Yes), the monitor controller B4 notifies the host control board 11 that sufficient reception signal level is secured (Step S70). Then, the monitor controller B4 monitors the bit error state of transmission/reception circuit module B1 (Step S71), and determines whether there is any bit error (Step S72). At this step, when the monitor controller B4 determines that there is any bit error (Yes), the monitor controller B4 adjusts the parameter for the reception equalizer in the parameter setting module B3 (Step S73). Then, the monitor controller B4 returns to Step S71, and continues monitoring of the bit error state. When it is determined in Step S72 that there are no bit errors (No), the reception setting processing is ended.

According to the above processing, even when the electronic circuit board 13$i$ is hot-inserted into a desired slot, the reception parameter of the electronic circuit board 13$i$ can be automatically adjusted, and the transmission signal output from the switch processing board 12 can be securely received by the electronic circuit board 13$i$ which has been hot-inserted.

The following is explanation of adjustment performed to cause a transmission signal output from the electronic circuit board 13$i$, which has been hot-inserted, to be securely received by the switch processing board 12.

FIG. 12 is a flowchart illustrating a flow of reception setting processing performed by the monitor controller C4 of the switch processing board 12, FIG. 12 is a flowchart illustrating a flow of processing performed by the host control board 11 when the reception setting processing is performed in the communication switch board 12, and FIG. 13 is a flowchart illustrating a flow of transmission setting processing performed by the monitor controller B4 of each electronic circuit board 13i.

As illustrated in FIG. 11, a monitor controller C4 in the communication switch board 12 determines whether the apparatus has started or not (Step S85). When it is determined that the apparatus has started (Yes), the monitor controller C4 determines whether there is an inquiry about start from the host control board 11 (Step S86). When there is an inquiry about start, the monitor controller C4 notifies the host control board 11 that the apparatus has started (Step S87). Then, the monitor controller C4 monitors the reception state of the transmission/reception circuit board C1 (Step S88), and determines whether the reception signal level is sufficient or not (Step S89). When the monitor controller C4 determines that the reception signal level is not sufficient (No), the monitor controller C4 instructs the parameter setting module C3 to increase the reception gain by one step (Step S90). In this state, the monitor controller C4 determines whether the reception gain is maximum or not (Step S91). When the monitor controller C4 determines that the reception gain is not maximum (No), the monitor controller C4 returns to Step S88 to continue monitoring of the reception state, and repeats increase in the reception gain by one step in Step S89, until it is determined in Step S89 that the reception signal level is sufficient or it is determined in Step S91 that the reception gain is maximum. When it is determined in Step S91 that the reception gain is maximum (Yes), the monitor controller C4 notifies the host control board 11 that no sufficient reception signal level is secured (Step S82). When it is determined in Step S89 that the reception signal level is sufficient (Yes), the monitor controller C4 notifies the host control board 11 of it (Step S93).

As illustrated in FIG. 12, the host control board 11 inquires of the switch processing board 12 whether the board has started (Step S97), and determines whether there is any notification of start from the switch processing board 12 (Step S98). When the host control board 11 receives no start notification from the switch processing board 12 (No), the host control board 11 recognizes that the switch processing board 12 is detached in a hot-plug manner (Step S99). When the host control board 11 receives start notification from the switch processing board 12 (Yes), the host control board 11 recognizes that the switch processing board 12 has started (Step S100), and determines whether any notification that no sufficient reception signal level is secured is transmitted from the switch processing board 12 (Step S101). When any notification that no sufficient reception signal level is secured is transmitted (Yes), the host control board 11 instructs the electronic circuit board 13i, which has been hot-inserted, to increase the transmission parameter for the signal amplitude or the drive current by one step (Step S102), as transmission setting for the switch processing board 12. Then, the host control board 11 determines whether there is any notification that sufficient reception signal level is secured (Step S103), and repeats the processing of Step S55 until the host control board 11 receives notification that sufficient reception signal level is secured. When it is determined in Step S103 that sufficient reception signal level is secured (Yes), the host control board 11 stops the processing of Step S102, and instructs the electronic circuit board 13i to stop adjustment of the transmission parameter (Step S104).

On the other hand, as illustrated in FIG. 13, the monitor controller B4 in the electronic circuit board 13i determines whether any instruction to adjust the transmission parameter is transmitted from the host control board 11 (Step S105). When any instruction to adjust the transmission parameter is transmitted (Yes), the monitor controller B4 increases the transmission parameter for the signal amplitude or the drive current by one step for the parameter setting module B3 (Step S106), as transmission setting corresponding to transmission/reception circuit module C1i of the switch processing board 12, and continues to increase the transmission parameter of Step S106 until an instruction to stop setting is issued (Step S107).

In addition, as illustrated in FIG. 11, when the monitor controller C4 in the switch processing board 12 determines in Step S89 that the reception signal level is sufficient (Yes), the monitor controller C4 notifies the host control board 11 that sufficient reception signal level is secured (Step S93). Then, the monitor controller C4 monitors the bit error state of transmission/reception circuit module A1i (Step S94), and determines whether there is any bit error (Step S95). In this step, when the monitor controller C4 determines that there is any bit error (Yes), the monitor controller C4 adjusts the parameter for the reception equalizer in the parameter setting module C3 (Step S96). Then, the monitor controller C4 returns to Step S94, and continues monitoring of the bit error state. When it is determined in Step S95 that there are no bit errors (No), the reception setting processing is ended. Thereby, preparation for starting communication is ended.

As described above, also according to the second embodiment, it is automatically recognized which slot the electronic circuit board has been inserted in hot swap, and the transmission/reception parameters can be automatically set. As a result, it becomes unnecessary to manually perform reception setting in hot swap, and the cost is reduced.

Third Embodiment

Figure 14:
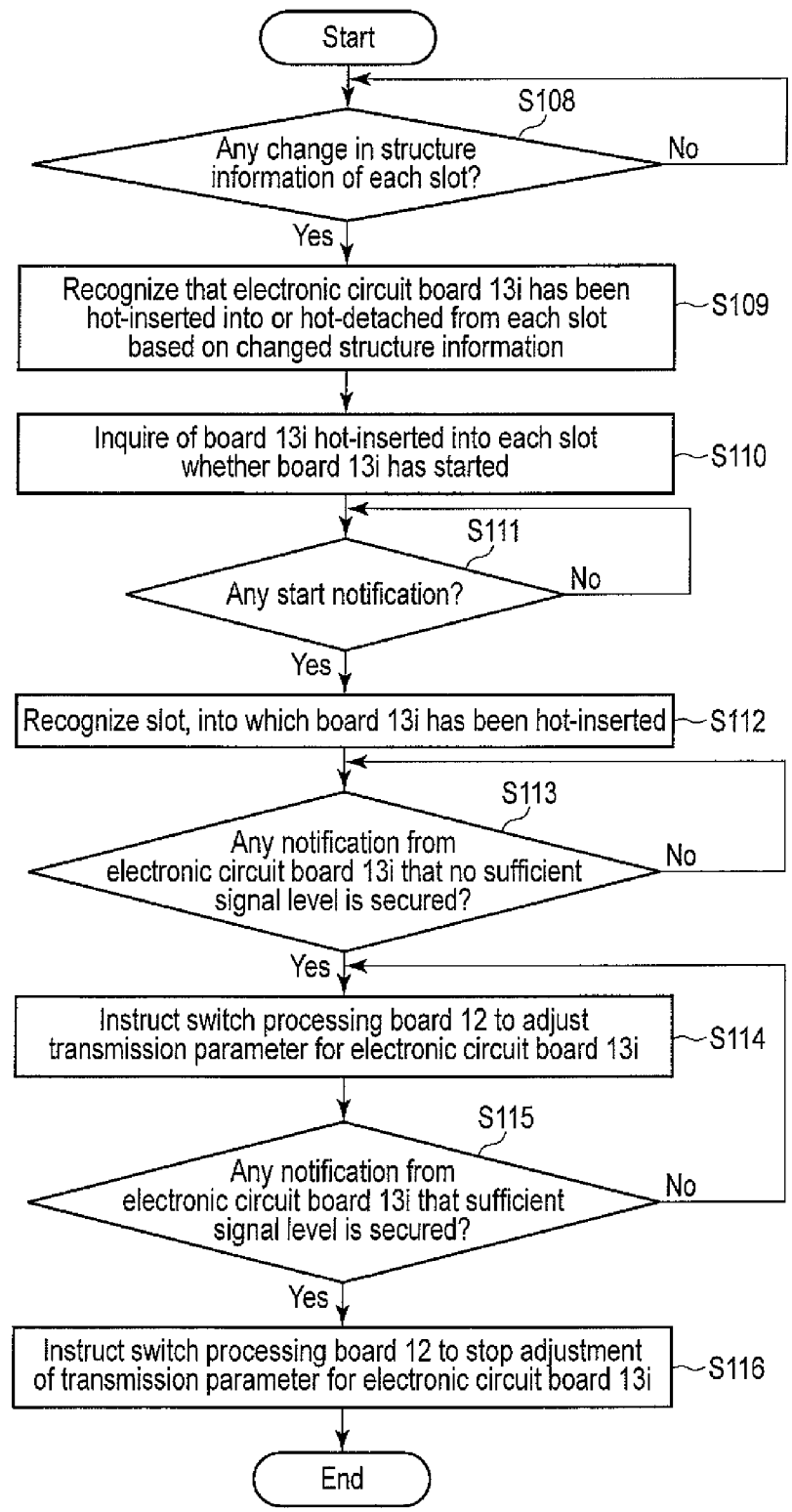
FIG. 14 is a flowchart illustrating a flow of processing performed by a host control board in reception setting processing in an electronic circuit board according to the third embodiment.

In the second embodiment, the host control board 11 automatically recognizes that the electronic circuit board 13i is hot-inserted into or hot-detached from any slot. Change in the structure information (hot swap state of the board) of each slot may be stored in advance in a host control board 11. FIG. 14 illustrates a flow of the processing.

In FIG. 14, the host control board 11 determines whether the structure information of each slot has been changed or not (Step S108). When the structure information has been changed (Yes), the host control board 11 recognizes that the electronic circuit board 13i is hot-inserted into or hot-detached from each slot, based on the changed structure information (Step S109). Then, the host control board 11 inquires of the board 13i having been hot-inserted into each slot whether the board is started (Step S110), and determines whether start notification is transmitted (Step S111). When the host control board 11 receives start notification (Yes), the host control board 11 recognizes the slot, in which the board 13i has been hot-inserted (Step S112).

In this state, the host control board 11 determines whether any notification that no sufficient reception signal level is secured is received from the electronic circuit board 13i (Step S113). When the notification is received (Yes), the host control board 11 instructs the switch processing board 12 to adjust the transmission parameter for the electronic circuit board 13i (Step S114), and continues the adjustment instruction until the host control board 11 receives notification that sufficient reception signal level is secured from the electronic circuit board 13i (Step S115). When notification that sufficient reception signal level is secured is received from the electronic circuit board 13i (Step S116), the host control board 11 ends the processing.

According to the above structure, change in the slot structure information is stored in advance in the host control board 11. Thus, it suffices to determine whether any start notification is issued for only the slot, into which the board has been hot-inserted, and it can be efficiently recognizes whether the board hot-inserted into the slot has started or not.

Although the above embodiments show the examples in which each of the switch processing board and each electronic circuit board includes a parameter setting modules, the embodiments can be carried out also in the case where the switch processing board includes a transmission parameter setting module and each electronic circuit board includes a reception parameter setting module, or in the case where the switch processing board includes a reception parameter setting module and each electronic circuit board includes a transmission parameter setting module.

In addition, for example, memory boards, interface boards configured to connect to various communication devices, and decoder/encoder boards can be used as the electronic circuit boards 131 to 13n in the above embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a transmission device including a plurality of free slots configured to detachably connect boards to a transmission line, a dedicated slot connected to all the free slots through the transmission line, and a plurality of identification code generators provided in the respective free slots and providing the boards inserted into the free slots with slot identification codes;
a host controller to manage quality of transmission and reception signals of boards connected to the free slots and the dedicated slot of the transmission device;
an electronic circuit board to be inserted into one of the free slots, the electronic circuit board including a first transmission/reception circuit board to transmit and receive signals through the transmission line in accordance with transmission/reception parameters, a transmission/reception controller to control transmission/reception processing of the first transmission/reception circuit module, a first parameter setting module to set the transmission/reception parameters in the first transmission/reception circuit module, and a first monitor controller to monitor an operation state of the first transmission/reception circuit module and controls the first parameter setting module; and
a switch processing board connected to the dedicated slot, the switch processing board including a plurality of second transmission/reception circuit modules to transmit and receive signals to and from electronic circuit boards inserted into the respective free slots in accordance with the transmission/reception parameters, a switch module to selectively turn on and off transmission/reception processing of each of the second transmission/reception circuit modules, a second parameter setting module to set the transmission/reception parameters in the second transmission/reception circuit modules, and a second monitor controller to monitor an operation state of each of the second transmission/reception circuit modules and control the second parameter setting module, wherein when the electronic circuit board is hot-inserted into one of the free slot;
the first monitor controller of the electronic circuit board recognizes the free slot, into which the electronic circuit board has been hot-inserted, by obtaining a slot identification code from the identification code generator corresponding to the free slot into which the electronic circuit board has been hot-inserted, notifies the host control device of start together with slot information recognized by the host control device, monitors a reception state of the first transmission/reception circuit module, causes the first parameter setting module to change the reception parameter of the first transmission/reception circuit module such that the reception state is changed to a predetermined state, and notifies the host control device that the reception state is not changed to the predetermined state when the reception state is not changed to the predetermined state;
the host control device instructs the switch processing board to change the transmission parameter, in response to the slot information and start notification, such that the reception state of the electronic circuit board which has issued the notification is changed to the predetermined state; and
the second monitor controller of the switch processing board causes the second parameter setting module to change the transmission parameter of the second transmission/reception circuit module, in accordance with an instruction from the host control device.

2. The electronic apparatus of claim 1, wherein
the first monitor controller monitors at least a level of a signal received from the transmission device, and changes a reception gain as the reception parameter.

3. The electronic apparatus of claim 1, wherein
the first monitor controller monitors at least a bit error of a signal received from the transmission device, and changes an equalizer value as the reception parameter.

4. The electronic apparatus of claim 1, wherein
the second monitor controller changes at least one of a signal amplitude or a drive current as the transmission parameter.

5. An electronic apparatus comprising:
a transmission device including a plurality of free slots configured to detachably connect boards to a transmission line, a dedicated slot connected to all the free slots through the transmission line, and a plurality of identification code generators provided in the respective free slots and providing the boards inserted into the free slots with slot identification codes;
a host controller to manage quality of transmission and reception signals of boards connected to the free slots and the dedicated slot of the transmission device;
an electronic circuit board to be inserted into one of the free slots, the electronic circuit board including a first transmission/reception circuit board to transmit and receive signals through the transmission line in accordance with transmission/reception parameters, a transmission/reception controller to control transmission/reception processing of the first transmission/reception circuit module, a first parameter setting module to set the transmission/reception parameters in the first transmission/reception circuit module, and a first monitor controller to monitor an operation state of the first transmission/reception circuit module and controls the first parameter setting module; and a switch processing board connected to the dedicated slot, the switch processing board including a plurality of second transmission/reception circuit modules to transmit and receive signals to and from electronic circuit boards inserted into the respective free slots in accordance with the transmission/reception parameters, a switch module to selectively turn on and off transmission/reception processing of each of the second transmission/reception circuit modules, a second parameter setting module to set the transmission/reception parameters in the second transmission/reception circuit modules, and a second monitor controller to monitor an operation state of each of the second transmission/reception circuit modules and control the second parameter setting module, wherein when the electronic circuit board is hot-inserted into one of the free slot;

the first monitor controller of the electronic circuit board recognizes the free slot, into which the electronic circuit board has been inserted, by obtaining a slot identification code from the identification code generator corresponding to the free slot into which the electronic circuit board has been hot-inserted, notifies the host control device of start in response to an inquiry transmitted from the host control device for each slot, monitors a reception state of the first transmission/reception circuit module, causes the first parameter setting module to change the reception parameter of the first transmission/reception circuit module such that the reception state is changed to a predetermined state, and notifies the host control device that the reception state is not changed to the predetermined state when the reception state is not changed to the predetermined state;

the host control device sends a start inquiry to each of the free slots, recognizes the electronic circuit board having been inserted in hot-swap manner by receiving start notification transmitted from the electronic circuit board in response to the start inquiry, and instructs the switch processing board to change the transmission parameter such that the reception state of the electronic circuit board which has issued the notification is changed to the predetermined state; and the second monitor controller of the switch processing board causes the second parameter setting module to change the transmission parameter of the second transmission/reception circuit module, in accordance with an instruction from the host control device.

6. The electronic apparatus of claim 5, wherein
the first monitor controller monitors at least a level of a signal received from the transmission device, and changes a reception gain as the reception parameter.

7. The electronic apparatus of claim 5, wherein
the first monitor controller monitors at least a bit error of a signal received from the transmission device, and changes an equalizer value as the reception parameter.

8. The electronic apparatus of claim 5, wherein
the second monitor controller changes at least one of a signal amplitude or a drive current as the transmission parameter.

9. An electronic apparatus comprising:
a transmission device including a plurality of free slots configured to detachably connect boards to a transmission line, a dedicated slot connected to all the free slots through the transmission line, and a plurality of identification code generators provided in the respective free slots and providing the boards inserted into the free slots with slot identification codes;

a host controller to manage quality of transmission and reception signals of boards connected to the free slots and the dedicated slot of the transmission device;

an electronic circuit board to be inserted into one of the free slots, the electronic circuit board including a first transmission/reception circuit board to transmit and receive signals through the transmission line in accordance with transmission/reception parameters, a transmission/reception controller to control transmission/reception processing of the first transmission/reception circuit module, a first parameter setting module to set the transmission/reception parameters in the first transmission/reception circuit module, and a first monitor controller to monitor an operation state of the first transmission/reception circuit module and controls the first parameter setting module; and a switch processing board connected to the dedicated slot, the switch processing board including a plurality of second transmission/reception circuit modules to transmit and receive signals to and from electronic circuit boards inserted into the respective free slots in accordance with the transmission/reception parameters, a switch module to selectively turn on and off transmission/reception processing of each of the second transmission/reception circuit modules, a second parameter setting module to set the transmission/reception parameters in the second transmission/reception circuit modules, and a second monitor controller to monitor an operation state of each of the second transmission/reception circuit modules and control the second parameter setting module, wherein when the electronic circuit board is notified of change in slot structure information as to hot-insertion or hot-detachment of the electronic circuit board into or from one of the free slot;

the first monitor controller of the electronic circuit board recognizes the free slot, into which the electronic circuit board has been inserted, by obtaining a slot identification code from the identification code generator corresponding to the free slot into which the electronic circuit board has been hot-inserted, notifies the host control device of start in response to an inquiry transmitted from the host control device for each slot, monitors a reception state of the first transmission/reception circuit module, causes the first parameter setting module to change the reception parameter of the first transmission/reception circuit module such that the reception state is changed to a predetermined state, and notifies the host control device that the reception state is not changed to the predetermined state when the reception state is not changed to the predetermined state;

the host control device recognizes that the electronic circuit board has been inserted into or detached from each free slot in hot-swap manner based on content of change in the slot structure information, inquires of the free slot, for which hot swap is indicated, whether the electronic circuit board has started or not, and issues an instruction to change the transmission parameter such that the reception state of the electronic circuit board which has issued start notification is changed to the predetermined state; and the second monitor controller of the switch processing board causes the second parameter setting module to change the transmission parameter of the second transmission/reception circuit module, in accordance with an instruction from the host control device.

10. The electronic apparatus of claim 9, wherein
the first monitor controller monitors at least a level of a signal received from the transmission device, and changes a reception gain as the reception parameter.

11. The electronic apparatus of claim 9, wherein the first monitor controller monitors at least a bit error of a signal received from the transmission device, and changes an equalizer value as the reception parameter.

12. The electronic apparatus of claim 9, wherein
the second monitor controller changes at least one of a signal amplitude or a drive current as the transmission parameter.

13. An electronic apparatus comprising:
a transmission device including a plurality of free slots configured to detachably connect boards to a transmission line, a dedicated slot connected to all the free slots through the transmission line, and a plurality of identification code generators provided in the respective free slots and providing the boards inserted into the free slots with slot identification codes;
a host controller to manage quality of transmission and reception signals of boards connected to the free slots and the dedicated slot of the transmission device;
an electronic circuit board to be inserted into one of the free slots, the electronic circuit board including a first transmission/reception circuit board to transmit and receive signals through the transmission line in accordance with transmission/reception parameters, a transmission/reception controller to control transmission/reception processing of the first transmission/reception circuit module, a first parameter setting module to set the transmission/reception parameters in the first transmission/reception circuit module, and a first monitor controller to monitor an operation state of the first transmission/reception circuit module and controls the first parameter setting module; and
a switch processing board connected to the dedicated slot, the switch processing board including a plurality of second transmission/reception circuit modules to transmit and receive signals to and from electronic circuit boards inserted into the respective free slots in accordance with the transmission/reception parameters, a switch module to selectively turn on and off transmission/reception processing of each of the second transmission/reception circuit modules, a second parameter setting module to set the transmission/reception parameters in the second transmission/reception circuit modules, and a second monitor controller to monitor an operation state of each of the second transmission/reception circuit modules and control the second parameter setting module, wherein
when the switch processing board is hot-inserted into the dedicated slot;
the second monitor controller of the switch processing board determines whether the switch processing board itself has started, notifies the host control device of start of the switch processing board when it recognizes start of the switch processing board, monitors a reception state of each of the second transmission/reception circuit modules, causes the parameter setting module to change the reception parameter of the second transmission/reception circuit module such that the reception state of each second transmission/reception circuit module is changed to a predetermined state, and notifies the host control device that the reception state is not changed to the predetermined state when the reception state is not changed to the predetermined state;
the host control device instructs the corresponding electronic circuit board to change the transmission parameter, such that the reception state of the electronic circuit board which has issued the notification is changed to the predetermined state; and
the first monitor controller of the electronic circuit board causes the first parameter setting module to change the transmission parameter of the first transmission/reception circuit module, in accordance with an instruction from the host control device.

14. The electronic apparatus of claim 13, wherein
the second monitor controller monitors at least a level of a signal received from the transmission device, and changes a reception gain as the reception parameter.

15. The electronic apparatus of claim 13, wherein
the second monitor controller monitors at least a bit error of a signal received from the transmission device, and changes an equalizer value as the reception parameter.

16. The electronic apparatus of claim 13, wherein
the first monitor controller changes at least one of a signal amplitude or a drive current as the transmission parameter.

17. An electronic apparatus comprising:
a transmission device including a plurality of free slots configured to detachably connect boards to a transmission line, a dedicated slot connected to all the free slots through the transmission line, and a plurality of identification code generators provided in the respective free slots and providing the boards inserted into the free slots with slot identification codes;
a host controller to manage quality of transmission and reception signals of boards connected to the free slots and the dedicated slot of the transmission device;
an electronic circuit board to be inserted into one of the free slots, the electronic circuit board including a first transmission/reception circuit board to transmit and receive signals through the transmission line in accordance with transmission/reception parameters, a transmission/reception controller to control transmission/reception processing of the first transmission/reception circuit module, a first parameter setting module to set the transmission/reception parameters in the first transmission/reception circuit module, and a first monitor controller to monitor an operation state of the first transmission/reception circuit module and controls the first parameter setting module; and
a switch processing board connected to the dedicated slot, the switch processing board including a plurality of second transmission/reception circuit modules to transmit and receive signals to and from electronic circuit boards inserted into the respective free slots in accordance with the transmission/reception parameters, a switch module to selectively turn on and off transmission/reception processing of each of the second transmission/reception circuit modules, a second parameter setting module to set the transmission/reception parameters in the second transmission/reception circuit modules, and a second monitor controller to monitor an operation state of each of the second transmission/reception circuit modules and control the second parameter setting module, wherein
when the switch processing board is hot-inserted into the dedicated slot;
the second monitor controller of the switch processing board determines whether the switch processing board itself has started, notifies the host control device of start of the switch processing board when it receives a start inquiry from the host control device, monitors a reception state of each of the second transmission/reception circuit modules, causes the parameter setting module to change the reception parameter of the second transmission/reception circuit module such that the reception state of each second transmission/reception circuit module is changed to a predetermined state, and notifies the host control device that the reception state is not changed to the predetermined state when the reception state is not changed to the predetermined state;

the host control device instructs the corresponding electronic circuit board to change the transmission parameter, such that the reception state of the second transmission/reception circuit module which has issued the notification is changed to the predetermined state; and the first monitor controller of the electronic circuit board causes the first parameter setting module to change the transmission parameter of the first transmission/reception circuit module, in accordance with an instruction from the host control device.

18. The electronic apparatus of claim 17, wherein the second monitor controller monitors at least a level of a signal received from the transmission device, and changes a reception gain as the reception parameter.

19. The electronic apparatus of claim 17, wherein the second monitor controller monitors at least a bit error of a signal received from the transmission device, and changes an equalizer value as the reception parameter.

20. The electronic apparatus of claim 17, wherein the first monitor controller changes at least one of a signal amplitude or a drive current as the transmission parameter.

\* \* \* \* \*